Jan. 9, 1962   N. C. L. BROWN ETAL   3,016,457
DETECTION MEANS FOR IMPROPERLY LUBRICATED JOURNALS
Filed Sept. 30, 1957
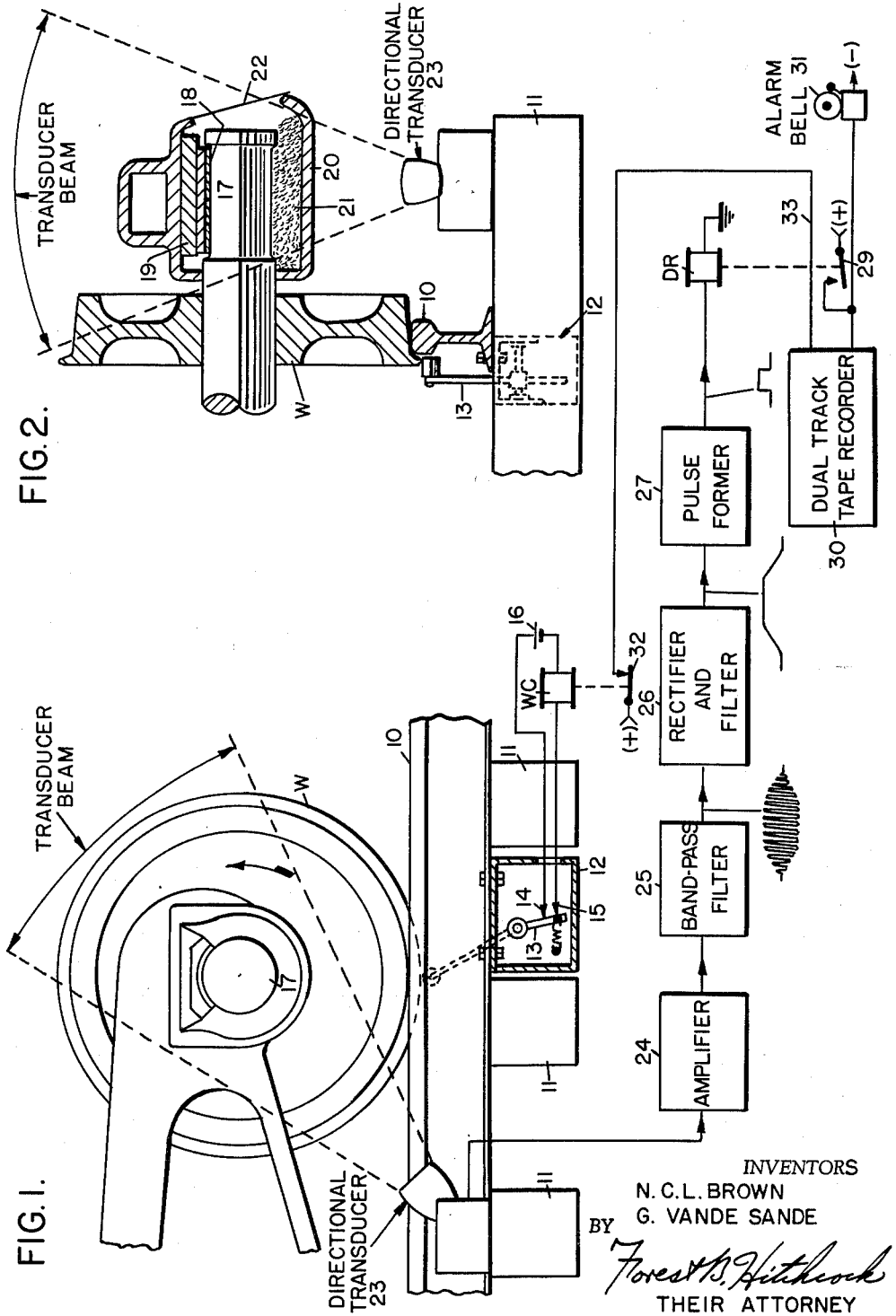
INVENTORS
N. C. L. BROWN
G. VANDE SANDE
BY
Forest B. Hitchcock
THEIR ATTORNEY

United States Patent Office 3,016,457
Patented Jan. 9, 1962

3,016,457
DETECTION MEANS FOR IMPROPERLY LUBRICATED JOURNALS
Ned C. L. Brown, Scottsville, and George Vande Sande, Rochester, N.Y., assignors to General Railway Signal Company, Rochester, N.Y.
Filed Sept. 30, 1957, Ser. No. 687,148
3 Claims. (Cl. 246—169)

This invention relates to means for detecting an improperly lubricated journal and more particularly pertains to means for detecting such journals on moving railway cars as they pass a fixed detecting location.

Various means for the detection of improperly lubricated journals are to be found in the prior art. For the most part, these rely upon the detection of the heat that is generated by such a journal. Some employ car-carried apparatus comprising fusible elements which melt at predetermined journal temperatures and act to give an indication to an observer or act directly to apply the brakes of the train automatically. Other schemes comprise fixed wayside equipment which is sensitive to the radiation of infrared electromagnetic energy from a hot bearing and, in this way, gives an indication as to the passage of such a bearing.

According to the present invention, it is contemplated to make use of an entirely different phenomenon associated with an improperly lubricated journal. Thus, it is proposed to provide detecting means at a fixed location along the track rail comprising an electro-acoustical transducer which will be responsive to high frequency sound vibrations generated by a journal rotating in a dry bearing. The distinctive, high-frequency sound vibrations emanating from such a journal are converted by the transducer to corresponding electrical signals which are then amplified and the resulting output applied to electronic circuits that will record the fact that an improperly lubricated journal has passed the detecting location. In addition, wheel counting means is provided so that a record is also made as to the location on the train of such improperly lubricated journal.

It is thus an object of the invention to provide detection means for improperly lubricated journals that comprises means responsive to the high-frequency sound vibrations generated by such a journal.

It is an additional object of this invention to provide transducer means of a highly directional character along the trackway and so positioned as to be particularly responsive to sound originating from a passing improperly lubricated journal and to provide associated means that is distinctively responsive to such intercepted sound.

In describing this invention in detail, reference will be made to the accompanying drawings in which like reference characters designate corresponding parts in the two views and in which:

FIG. 1 illustrates our embodiment of this invention; and

FIG. 2 is a sectional view particularly illustrating the construction of the journal and associated bearing and also showing the positioning of the transducer means relative to a journal of a passing railway car.

In order to simplify the illustration and facilitate in the explanation of the invention, the various parts and circuits have been shown diagrammatically, and certain conventional illustrations have been employed to make it easier to understand the principles of this invention rather than to illustrate the specific constructions and arrangements of parts that might be used in practice. For example, certain conventional electronic circuits, well-known in the art, have been shown in block diagram form rather than by showing the detailed circuitry thereof.

The torque exerted on the axle of a railway car is, for all practical purposes, unlimited as compared to the opposing frictional forces developed in the journal. Thus, the journal will continue to rotate at substantially the same average angular velocity even when the frictional force opposing the rotation is quite considerable. Despite the unlimited torque, the frictional force on the journal produced by the bearing will, under conditions of high journal friction, be sufficiently great to produce a momentary, minute torsional deflection of the axle. The restraining force producing this deflection is eventually overcome, however, by the unlimited torque exerted on the journal. At such time, the journal springs back to its undeflected state; however, constantly effective restraining force exerted by friction on the end of the axle immediately causes torsional deflection to recur. Thus, the rotation of the axle under conditions of improper lubrication may be characterized as a succession of minute torsional deflections, each being followed by a springing back of the shaft to its original, non-deflected condition. Such minute deflection of the shaft constitutes a vibratory motion, resulting in the generation of sound waves which can be detected by wayside apparatus.

The angular deflection is a function of the diameter of the shaft and its length and is also dependent upon the coefficient of friction of the material and the force pressing the two rubbing surfaces together. Principally because of the considerable diameter of the shaft and its relatively short length, the torsional deflection can be only a very small amount before the resistance to further deflection will be so great as to cause the shaft to spring back to its undeflected state. As a result, successive torsional deflections occur at a very rapid rate with the result that the sound vibrations emanating from such an intermittently deflected journal take place at a high frequency.

The exact frequency of the vibration will vary over a fairly substantial range. For example, a heavily loaded car resulting in a high bearing pressure, a high coefficient of friction between the rubbing surfaces, and a low relative velocity of the rubbing surfaces will all tend to lower the frequency at which vibrations occur. Conversely, the opposite condition will, of course, increase the frequency of such vibration. It is thus necessary that the transducer means employed to convert the sound vibrations to electrical energy have relatively broad frequency response characteristics in the supersonic region at which these vibrations occur. Of course, the transducer means should preferably be less responsive to frequencies outside of the desired region so as to contribute, thereby, to improving the signal-to-noise ratio.

The above reasons given as to the origin of the sound generated as an improperly lubricated axle rotates in its associated journal are presented only as one possible theory. Additional or even different factors may be in-instrumental in the generation of this sound without affecting the utility of the apparatus of this invention in detecting such sound and thereby determining that the undesirable condition, i.e. improper axle lubrication, exists.

In the drawing, the conventional track rails 10 are shown fastened to the ties 11. A single wheel W of a truck of a passing railway car is shown at the particular instant in its travel that the wheel flange is effective to close the contacts of a track instrument or contactor 12. The contactor includes the rotatable spring-biased member 13 which is actuated by each car wheel to a position where it bridges the fixed contacts 14 and 15. Each closure of these contacts 14 and 15 results in a monentary picking up of the armature of wheel counting relay WC as a result of its energization from battery 16.

This FIG. 1 also illustrates the transducing means which may be a microphone particularly adapted to respond to high sound frequencies and having a limited angle of response, i.e. it is particularly responsive only to sound vibrations occurring only within a restricted angle of acceptance. This transducer is so positioned along the trackway that the journals of each truck will pass directly through its beam of acceptance. FIG. 2, which particularly illustrates a sectional view of a journal and its associated bearing, further illustrates the positioning of the transducer relative to the track rails so as to be able to respond to sound vibrations from a passing journal.

The apparatus shown in FIGS. 1 and 2 provides for the detection of improperly lubricated journals on only one side of a train; similar means must be associated with the opposite track rail as well.

The journal 17 is shown in FIG. 2 as having a portion along its axis which is of reduced diameter so as to receive the bearing 18. This bearing is formed of bronze but has a facing of Babbitt on the face that faces the journal. A filler block 19 is provided in the space between the bearing 18 and the inside, upper surface of the journal box 20. The lower portion of this journal box 20 is filled with waste material 21 that is saturated with oil. The rubbing of the bottom surface of the journal against the saturated waste provides the desired lubrication. Access to the journal box is provided through the hinged cover 22.

When the waste 21 is not sufficiently saturated, insufficient oil is transferred to the journal's bottom surface so that the friction between the journal 17 and bearing 18 increases appreciably. This results in heating of the journal and bearing, and this heat is transferred also to the waste material 21, causing the waste lubricant to be further dissipated. If the condition is allowed to continue, such high temperatures are reached as a result of the high friction that the waste material 21 will burn and the journal temperature will become so high also that a breakage of the axle may eventually result.

In the manner already described, the high frictional forces produced under conditions of poor journal lubrication result in successive, minute torsional deflections of the axle. These deflections are evidenced by the generation of sound energy occurring at a relatively high frequency primarily because of the dimensions of the axle. The amplitude of the sound is, however, quite appreciable so that it can be distinguished from other sounds normally generated by a freight car as it moves along the trackway. Under certain circumstances it may be desirable to utilize various expedients to suppress, insofar as possible, other sound energy not caused by the torsional deflections of the axle. One such expedient would be to insulate the track rails 10 from the ties 11 by pads formed of rubber or other similar material effective to lessen the transmission of vibrations from the track rails 10.

The high frequency sound energy intercepted by the transducer 23 is converted by the transducer to corresponding electrical signals which are applied to an amplifier 24. The output of the amplifier is then applied through a band-pass filter 25 to the rectifier and filter 26. The band-pass filter 25 is so organized that it will readily pass the range of frequencies found to be produced by an improperly lubricated journal, but this filter 25 acts to discriminate against other frequencies, thereby improving the signal-to-noise ratio of the system. The output of the filter 25 thus comprises an alternating-current signal whose duration is a function of the time required for the journal to pass through the beam of the transducer 23. The rectifier and filter 26 operate in a conventional manner upon this alternating-current signal to provide an output to the pulse former 27 that comprises essentially the envelope of the output of the filter 25. More specifically, the rectification that occurs converts the output of filter 25 to a direct-current signal; the alternating-current component is filtered out so that the output signal remaining is essentially the envelope of the output of filter 25.

The input signal to the pulse former 27 thus comprises, for each improperly lubricated passing journal, an input pulse of indeterminate length and having leading and trailing edges that are dependent upon the velocity of the railway car. The pulse former 27 comprises means well-known in the art to respond to such input pulse and provide an output pulse that is of a fixed duration and with abrupt leading and trailing edges. This output pulse is of sufficient length to maintain the relay DR energized for a predetermined length of time that is independent of the deviation of the output pulse of the pulse former 27.

The relay DR is provided with a front contact 29 which is thus momentarily closed each time that an improperly lubricated journal passes through the acceptance beam of the transducer 23. As a result of the closure of this front contact 29, energy is applied from the terminal (+) and through this front contact 29 to the dual track tape recorder 30. The recorder 30 responds to such energization by causing a record to be made on one channel of the tape. The recording of the closure of front contact 29 may be accomplished on paper tape by the perforation of such tape or may be recorded on magnetic tape in the customary manner. Each closure of front contact 29 also results in the momentary energization of the alarm bell 31 which causes an audible signal to be given of the fact that an improperly lubricated journal has passed through the acceptance beam of the transducer 23.

Each actuation of the wheel counting relay WC results in a closure of front contact 32 of this relay so that energy can be applied from the terminal (+) through this front contact 32, to the dual track tape recorder 30. Energization of the recorder 30 in this way causes a recording of such energization to appear on the other track of the recording tape. It can be thus readily seen that channel A of the tape will record the number of wheels passing the detecting location. Channel B will, on the other hand, record each journal in need of lubrication. Inspection of the tape will thus quickly review the location on a train of each journal in need of lubrication. The movement of the tape in the dual track tape recorder 30 may be continuous or, alternatively, the recorder may so be organized that the tape will be advanced a predetermined amount for each energization of wire 33.

This invention has been disclosed as having particular utility in the detection of improperly lubricated journals on railway cars. It should be understood, however, that it is also applicable to other types of bearings. Moreover, we desire it to be understood that various modifications, adaptations, and alterations may be made to the specific form shown to meet the requirements of practice without any manner departing from the spirit or scope of this invention.

What we claim is:

1. The method of detecting the presence of an inadequately lubricated journal for an axle on a railway car comprising the steps of, firstly, positioning a sound-responsive means adjacent the trackway; secondly, moving said axle, while rotating, into proximity with said sound-responsive means thereby to cause said responsive means to be energized by sound waves emanating from said journal; and thirdly, detecting the output of said sound-responsive means thereby to detect particular sound waves emanating from said journal which are characteristic of an inadequately lubricated journal, said sound-responsive means comprising an electro-acoustic transducer for converting the received sound energy into an electrical signal, said third step comprising the use of detecting means connected to the output of said sound-responsive means including amplifier and filtering means for amplifying the output of said sound-responsive means and for passing those frequencies which are characteristic of the sonic frequencies emanating from said journal when the frictional forces therein exceed a predetermined maximum value occurring before said journal becomes overheated and at the same time suppressing other frequencies normally resulting from motion of said car.

2. The method as set forth in claim 1 wherein said transducer is so positioned that said characteristic high frequency sound wave emanating from said journal is transmitted to said transducer principally through the air space intervening therebetween.

3. The method as set forth in claim 1 wherein said transducer has a limited angle of acceptance of sound energy and is so positioned and directed along the trackway that its angle of acceptance includes said journal protruding from the side of the undercarriage of said car as it passes said transducer location but substantially excludes other parts of said car which also produce sonic frequencies during car movement.

References Cited in the file of this patent

UNITED STATES PATENTS

| | | |
|---|---|---|
| 1,516,809 | Duncan | Nov. 25, 1924 |
| 1,775,675 | Gherassimoff | Sept. 16, 1930 |
| 2,337,414 | Rieber | Dec. 21, 1943 |
| 2,592,163 | Madden | Apr. 8, 1952 |
| 2,633,205 | Rayder | Mar. 31, 1953 |
| 2,818,508 | Johanson et al. | Dec. 31, 1957 |
| 2,829,267 | Howell | Apr. 1, 1958 |
| 2,900,039 | Burnett | Aug. 18, 1959 |

FOREIGN PATENTS

| | | |
|---|---|---|
| 1,002,381 | Germany | Feb. 14, 1957 |